Patented Jan. 12, 1954

2,666,044

UNITED STATES PATENT OFFICE 2,666,044

ALKYL ACRYLATE/N-HYDROCARBON-SUBSTITUTED ACRYLAMIDE/UNSATURATED TERTIARY AMINO COMPOUND COPOLYMERS

Willard E. Catlin, Wilmington, Del., assignor to E. I. du Pont de Nemours and Company, Wilmington, Del., a corporation of Delaware No Drawing. Application March 9, 1951, Serial No. 214,854

6 Claims. (Cl. 260—80.5)

This relates to three component addition copolymers and, more particularly, to novel copolymers of this type comprising esters of acrylic or alpha-substituted acrylic acids.

The esters of acrylic and alpha-substituted acrylic acids have been known for a considerable period and their polymerization and copolymerization with selected comonomers thoroughly studied. The simpler members of this class, e. g., methyl acrylate, methyl methacrylate and the like, are manufactured on a large scale and represent an important portion of the plastics industry. Similarly, the polymerizable ethylenically unsaturated compounds containing basic tertiary amino groups, particularly the esters of acrylic and alpha-substituted acrylic acids with amino alcohols, wherein the amine group is omega and tertiary, and the polymers and copolymers therefrom have long been known and their properties thoroughly studied.

These various polymers, despite their many desirable properties, do not exhibit in a sufficiently high degree the many properties necessary for a general purpose resin. For example, although possessing some utility as lubricant additives, they leave much to be desired in improvement in viscosity index and in resistance to sludge formation. Similarly, they are not completely satisfactory as fabric or paper coating agents, particularly with respect to the hardness of the resulting finishes. As has been demonstrated in the gradually increasing store of knowledge being acquired on addition type polymers and copolymers, each type of polymer has individual properties which differ from those of other polymers.

An object of the present invention is to provide novel three component addition copolymers and, more specifically, such copolymers containing esters of acrylic or alpha-substituted acrylic acids. A further object is to provide such copolymers having properties required for a general purpose resin. A still further object is to provide such copolymers having outstanding utility as lubricant additives. Other objects will be apparent from the description of the invention given hereinafter.

The above objects are accomplished according to the present invention by providing a three component addition copolymer, the polymeric components of which essentially consist of, by weight of the copolymer, 50%–97.75% of a polymerized compound from the group consisting of the acrylic and alpha-substituted acrylic esters of saturated aliphatic alcohols of at least 8 carbon atoms; 2%–49.75% of a polymerized N-hydrocarbon-substituted acrylamide; and 0.25%–48% of a polymerized ethylenically unsaturated compound containing a basic tertiary amino group, all three components except for hydrogen on carbon amido nitrogen being free of reactive, i. e., Zerewitinoff active, hydrogens.

The three component copolymers of this invention exhibit a wide and surprising variety of outstanding and desirable properties. They are useful as adhesives, felting agents, dispersing agents for non-aqueous systems, and coating materials for fabrics and paper as applied from aqueous dispersions—those copolymers relatively high in combined tertiary amine component being particularly suitable for use as dispersing agents and coating materials. These copolymers are also useful as laminating resins and coating materials for fabrics and papers as applied in the melt or from solution, those copolymers relatively high in combined tertiary amine component again being the best adapted for use as coating materials applied in the melt or from solution. Such copolymers will, in general, be characterized by greater flexibility and a harder surface, particularly as contrasted to the two component long-chain alkyl acrylate/basic tertiary amino group-containing compound copolymers.

A preferred embodiment of the invention resides in those three component copolymers consisting of, by weight of the copolymer, 55% to 97.5% of the acrylate component, 2% to 15% of the acrylamide component when it is an N-aryl-substituted acrylamide and 2% to 25% when it is an N-alkyl-substituted acrylamide, and 0.5% to 20% of the tertiary amino compound. These preferred copolymers are soluble in lubricating oils and, when incorporated therein, not only greatly improve the resistance of the oil to sludge formation but also markedly increase the viscosity index of the oil. This desirable and unusual combination of properties is achieved surprisingly with only a very slight increase in the viscosity of the oil composition at low temperatures in contrast to the much larger increases encountered with previously known lubricant additives for a comparable viscosity index improvement.

The preferred alkyl acrylates in the copolymers of the present invention are those of acrylic and alpha-substituted acrylic acids wherein the alpha-substituent, if present, is a lower alkyl radical, with saturated aliphatic alcohols of at least 8 carbon atoms and, preferably, from 12 to 18 carbon atoms, inclusive. The most desirable specific alkyl acrylates are those of acrylic and methacrylic acids with decyl and lauryl alcohols.

The N-hydrocarbon-substituted acrylamides used in the instant copolymers include the amides of acrylic and alpha-substituted, preferably alpha-hydrocarbon-substituted, acrylic acids, wherein the carbonamido nitrogen carries at least one hydrocarbon radical of 6 to 8 carbon atoms, inclusive, the hydrocarbon radical being alkyl, cycloalkyl, or aryl, and the total number of hydrocarbon substituents on the alpha-carbon and the carbonamido nitrogen not exceeding two. The preferred acrylamide may be represented by the formula

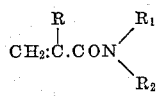

wherein R is hydrogen or alkyl and $R_1$ is hydrogen or a hydrocarbon radical of 6 to 18 carbon atoms, inclusive, and $R_2$ is a hydrocarbon radical of 6 to 18 carbon atoms, inclusive, the total number of hydrocarbon substituents on the alpha-carbon and the carbonamido nitrogen not exceeding two.

A particularly advantageous subgroup of the preferred acrylamides are those of acrylic acid and alpha-substituted acrylic acids wherein the alpha substituent is a lower alkyl radical, and the carbonamido nitrogen carries one aryl radical, preferably phenyl or alkylated phenyl.

The ethylenically unsaturated compounds containing a basic tertiary amino group, used in the copolymers of this invention include the polymerizable, basic tertiary amino compounds wherein the tertiary amino nitrogen is a member of a heterocycle and the polymerizable ethylenic unsaturation is extranuclearly bonded to said heterocycle, e. g., 2-vinylpyridine, and the polymerizable, basic tertiary amino compounds wherein the tertiary amino nitrogen is acyclic, e. g., compounds such as p-dimethylaminomethylstyrene and the basic tertiary aminoalkyl acrylates.

The basic tertiary aminoalkyl acrylates include the ester of acrylic and alpha-substituted acrylic acids with alkyl tertiary aminoalkanols. The preferred basic tertiary aminoalkyl acrylates are those of acrylic acid and alpha-substituted, preferably alpha-hydrocarbon-substituted, acrylic acids, wherein the two amino hydrogens are substituted by lower-aliphatic hydrocarbon radicals (which can be joined together in a ring), e. g., di-lower-alkyl-substituted amino-lower alkanols. The most preferred amino alkyl acrylates are the esters of acrylic and methacrylic acids with dimethylaminoethyl or diethylaminoethyl alcohols.

The following examples in which all parts are given by weight unless otherwise stated, illustrate specific embodiments of the invention:

EXAMPLE I

A mixture of 16 parts of lauryl methacrylate prepared from a technical grade of lauryl alcohol known as "Lorol" which is obtained by the hydrogenation of coconut oil, 3 parts of methacrylanilide, 1 part of beta-diethylaminoethyl methacrylate and, as a polymerization initiator, 0.15 part of alpha,alpha'-azodiisobutyronitrile, is placed in a reaction vessel having an opening for the escape of gas and fitted with an inlet tube reaching almost to the bottom. The reaction vessel is placed in a water bath maintained at 55°–60° C. and stirring of the polymerization mixture effected by bubbling oxygen-free nitrogen through the inlet tube. Heating is continued for 4 hours, during which time the monomer mixture polymerizes to a tough, rubber-like mass. The yield of three components 80/15/5 lauryl methacrylate / methacrylanilide / beta - diethylaminoethyl methacrylate copolymer is essentially quantitative.

EXAMPLE II

A mixture of 227.5 parts of lauryl methacrylate, 87.5 parts of N-tert.octylacrylamide prepared from diisobutylene and acrylonitrile by the method of Ritter and Minieri, J. Am. Chem. Soc. 70, 4045 (1948), and 35 parts of beta-diethylaminoethyl methacrylate are agitated slowly with 100 parts of mineral oil (an SAE 10, solvent-extracted, Mid-Continent oil) under an atmosphere of nitrogen. The mixture is heated to 65°–70° C. and one part of alpha,alpha'-azodiisobutyronitrile initiator is added. Heating is continued at 65°–70° C. until the charge thickens to the point where agitation is difficult at which point 250 additional parts of mineral oil are added slowly with stirring. The polymerization is continued at 65°–70° C. for a total of 12 hours. There is thus obtained an essentially quantitative yield of a 65/25/10 lauryl methacrylate/N-tert.octylacrylamide/beta-diethylaminoethyl methacrylate copolymer as a 50% solution in the mineral oil.

EXAMPLE III

In the manner described in Example I, 17.5 parts of lauryl methacrylate, 1.5 parts of methacrylanilide, 1.0 part of 4-(beta-methacrylyloxyethyl)morpholine are copolymerized in 20 parts of mineral white oil by heating at 60° C. for 6 hours in the presence of 0.14 part of alpha,alpha'-azodiisobutyronitrile as polymerization initiator. There is thus obtained an essentially quantitative yield of an 87.5/7.5/5.0 lauryl methacrylate/methacrylanilide/4 - (beta - methacrylyloxyethyl) - morpholine copolymer as a highly viscous solution in the mineral white oil.

Similar results are obtained by copolymerizing 340 parts, 40 parts, and 20 parts, respectively, of the three comonomers in 400 parts of mineral white oil using 2.4 parts of alpha,alpha'-azodiisobutyronitrile as polymerization initiator. There is thus obtained an essentially quantitative yield of an 85/10/5 lauryl methacrylate/methacrylanilide / 4 - (beta-methacrylyloxyethyl) morpholine copolymer as a highly viscous solution in the mineral white oil.

EXAMPLE IV

In a manner similar to that described in Example I, 153 parts of lauryl methacrylate, 18 parts of methacrylanilide, and 9 parts of p-dimethylaminomethylstyrene are copolymerized in 180 parts of mineral white oil by heating at 60° C. for 6 hours using 1.08 parts of alpha,alpha'-azodiisobutyronitrile as an initiator. There is thus obtained an essentially quantitative yield of an 85/10/5 lauryl methacrylate/methacrylanilide/p-dimethylaminomethylstyrene copolymer as a clear, highly viscous solution in the mineral white oil.

EXAMPLE V

In a manner similar to that described in Example I, 170 parts of lauryl methacrylate, 20 parts of methacrylanilide, and 10 parts of 2-methyl-5-vinylpyridine are copolymerized by heating for 6 hours at 60° C. in 200 parts of mineral white oil using 1.4 parts of alpha,alpha'-azodiisobutyronitrile as polymerization initiator. There is thus obtained an essentially quantitative yield of an 85/10/5 lauryl methacrylate/methacrylanilide/2-methyl-5-vinylpyridine copolymer as a clear, highly viscous solution in the mineral white oil.

EXAMPLE VI

In a manner similar to that described in Example I, 255 parts of lauryl methacrylate, 30 parts of methacrylanilide, and 15 parts of vinyl N,N-dibutyldithiocarbamate are copolymerized in bulk by heating for 4 hours at 55°–60° C. using 1.8 parts of alpha,alpha'-azodiisobutyronitrile as polymerization initiator. There is thus obtained an essentially quantitative yield of an 85/10/5 lauryl methacrylate/methacrylanilide/vinyl N,N-dibutyldithiocarbamate copolymer as a tough, rubber-like mass.

The vinyl N,N-dibutyldithiocarbamate was prepared by reacting acetylene with dibutylamine and carbon disulfide under super-atmospheric pressure as more fully disclosed in copending application Serial No. 146,156 filed February 24, 1950, jointly in the names of C. T. Handy and J. C. Sauer.

Lubricating oil compositions having a low rate of change of viscosity with temperature are highly desirable. Judgment of the suitability of a lubricating oil composition for use over a wide range of operating temperatures is afforded by the "viscosity index" of the oil which is calculated from the measured viscosities (expressed in centistokes) of the lubricating composition at 100° F. and 210° F. by the standard A. S. T. M. method, D–567–41. In this test lubricating compositions exhibiting the highest viscosity index show the least change in viscosity with change in temperature. An increase of 5 viscosity index units is a significant improvement.

Another measurement of value for judging the suitability of lubricating oil compositions is the calculated slope of the line joining the points of intersection of the viscosities of the oil composition at 100° F. plotted as ordinants with the viscosities at 210° F. plotted as abscissas for different concentrations of additives. This slope value is conveniently calculated from the following equation:

$$\text{Slope} = \frac{\text{viscosity of lubricating composition at }100°\text{ F. minus viscosity of lubricating oil alone at }100°\text{ F.}}{\text{viscosity of lubricating composition at }210°\text{ F. minus viscosity of lubricating oil alone at }210°\text{ F.}}$$

In this calculation, oils having the lowest values for slope exhibit the least change in viscosity with changes in temperature.

The following tables illustrate the outstanding behavior of certain of the three component copolymers of this invention as lubricant additives with respect to viscosity index and slope as defined above. The data given in Tables I and II are obtained on 1.5% solutions of the indicated three component copolymer in the indicated type lubricating oil except where other concentrations are specified. These solutions are obtained by dissolving the requisite copolymer in the lubricating oil by stirring at 100°–135° C.

*Table I*

MIXED BASE LUBRICATING OIL

| Added copolymers | Viscosity in centistokes | | Viscosity index | Slope |
|---|---|---|---|---|
| | 100° F. | 210° F. | | |
| None, control oil | 12.61 | 2.86 | 73.2 | |
| Lauryl methacrylate | 21.38 | 4.96 | 168.0 | 4.26 |
| 90/10 lauryl methacrylate/beta-diethylaminoethyl methacrylate | 28.89 | 6.73 | 168.2 | 4.20 |
| 75/25 lauryl methacrylate/beta-diethylaminoethyl methacrylate | 43.85 | 9.52 | 159.0 | 4.70 |
| 50/50 lauryl methacrylate/beta-diethylaminoethyl methacrylate | 25.15 | 6.08 | 172.4 | 3.90 |
| 80/5/15 lauryl methacrylate/beta-diethylaminoethyl methacrylate/methacrylanilide | 22.0 | 6.23 | 187.9 | 2.70 |

*Table II*

SOLVENT-EXTRACTED, PARAFFIN BASE LUBRICATING OIL

| Added copolymers | Viscosity in centistokes | | Viscosity index | Slope |
|---|---|---|---|---|
| | 100° F. | 210° F. | | |
| None, control | 46.96 | 6.52 | 97 | |
| Lauryl methacrylate: | | | | |
| (1.28% in oil) | 52.1 | 7.45 | 113.0 | 6.1 |
| (2.47% in oil) | 57.7 | 8.39 | 121.6 | 6.0 |
| 95/5 n-decyl acrylate/p-dimethylaminomethylstyrene | 53.41 | 7.70 | 116.0 | 5.7 |
| 95/5 lauryl methacrylate/p-dimethylaminomethylstyrene | 55.55 | 8.00 | 118.0 | 6.1 |
| 85/5/10 lauryl methacrylate/p-dimethylaminomethylstyrene/methacrylanilide | 53.83 | 8.47 | 131.0 | 4.48 |

*Table III*

ESTER LUBRICANT (DI-2-ETHYLHEXYL SEBACATE)

| Added copolymers | Viscosity in centistokes | | Viscosity index |
|---|---|---|---|
| | 100° F. | 210° F. | |
| None, control | 12.75 | 3.36 | 156.0 |
| N-octadecyl methacrylamide (2% conc.) | 15.66 | 4.07 | 168.5 |
| Lauryl methacrylate (2% conc.) | 28.29 | 7.60 | 176.0 |
| 50/48/2 n-decyl acrylate/beta-diethylaminoethyl methacrylate/N-phenylmethacrylamide (3% conc.) | 16.66 | 4.26 | 184.0 |

As can be seen from the foregoing tables, the three component copolymers of the present invention are markedly more effective as viscosity index improvers in both the mixed base and solvent extracted paraffin base lubricating oils, as well as the synthetic ester-type lubricants, than the long-chain alkyl acrylate homopolymers or, in fact, the long-chain alkyl acrylate/polymerizable, basic tertiary amino-containing compound copolymers.

Another important property which should be exhibited in the highest degree in good lubricating compositions is the ability of the lubricant to maintain the sludge normally formed during engine operation, in suspension, i. e., prevent its deposition on important operating portions of the engine such as the piston rings, the pistons themselves, etc. One method of evaluating this property, used as a standard test in the lubricating field, is the so-called Lauson engine test. This test is carried out under standard conditions in a Lauson engine operating at 1840±20

R. P. M. under a load of 1.86 horsepower using a fan brake with the engine operating at a jacket coolant temperature of 350° F. and an oil temperature of 200° F. with no crankcase ventilation for a period of 40 hours with an air:fuel ratio of 12.5±0.5:1 and a spark advance of 25° BTDC. The compositions are scored on the basis of their performance in these engine tests according to the following system: a ring sticking effect is rated at 20 times the percentage of the rings free at the end of the test, thereby making the maximum score for this item 20; piston skirt lacquer formation is rated on the following decreasing scale: no lacquer formation, 10 points; tan lacquer, 8 points; light brown lacquer, 6 points; brown lacquer, 4 points; darker brown lacquer, 2 points; black lacquer, 0 points, thus leaving the maximum score possible in this property, 10 points; ring blocking is evaluated by multiplying 10 by the percentage of the ring open, thus making the maximum score possible on this effect, 10 points; finally, under piston deposition is rated according to the following decreasing scale: no deposition, 10 points; trace deposition, 8 points; light deposition, 6 points; medium deposition, 4 points; heavy deposition, 2 points; very heavy deposition, 0 points, thereby allotting 10 points to the maximum score on this effect. Thus, the total maximum score for all four effects is 50 on this scoring method. Normally, the totals arrived at are multiplied by 2 on which basis a perfect score is, of course, 100.

The following results under the above-described conditions and scoring system are obtained with various indicated copolymers of this invention dissolved in the indicated concentrations in a mixed base lubricating oil.

*Table IV*

| Copolymer | Lauson engine test | |
|---|---|---|
| | Copoly. conc., Percent | Score |
| None, control | | 50 |
| Commercial detergent (a calcium petroleum-sulfonate) | ¹ 1.1 | 85 |
| 5/80/15 beta-diethylaminoethyl methacrylate/lauryl methacrylate/methacrylanilide | 1.0 | 76 |
| | 1.5 | 84 |
| 5/85/10 beta-diethylaminoethyl methacrylate/lauryl methacrylate/methacrylanilide | 1.0 | 84 |
| | 1.5 | 90 |
| 5/80/15 beta-diethylaminoethyl methacrylate/lauryl methacrylate/N-octylacrylamide | 1.0 | 80 |
| | 2.0 | 87 |

¹ 500 parts per million calcium.

As Table IV shows, the three component copolymers of the present invention are markedly effective as sludge suspension agents, in this respect being as good as a commercially used lubricant detergent and, at the same time, not presenting any of the problems created by the mineral ash deposition arising from the commercial type detergents.

Further data demonstrating the outstanding effectiveness of the three-component copolymers of this invention as sludge suspension agents are given in the following Table V recording results obtained in other Lauson engine tests, wherein the various copolymers were tested at a concentration of 1.5% in an SAE 20, solvent-extracted Mid-Continent oil containing 0.5% of a commercial sulphurized terpene corrosion inhibitor and antioxidant. For comparative purposes Lauson engine tests carried out under the same conditions with no additives in the oil gave a score of 58; with the addition of 0.5% of sulphurized terpene a score of 63; and with the addition of 0.5% of sulphurized terpene and 1.5% of a 90/10 lauryl methacrylate/N-phenylmethacrylamide copolymer a score of 70.

*Table V*

| Copolymer | Lauson engine score |
|---|---|
| 90/5/5 lauryl methacrylate/methacrylanilide/beta-diethylaminoethylmethacrylate | 88 |
| 95/2.5/2.5 copolymer of the same components | 83 |
| 92.5/2.5/5 copolymer of the same components | 91 |
| 89/10/1 copolymer of the same components | 81 |
| 87.5/2.5/10 copolymer of the same components | 85 |
| 85/5/10 copolymer of the same components | 88 |
| 85/10/5 copolymer of the same components | 90 |
| 85/10/5 lauryl methacrylate/methacrylanilide/beta-dibutyl aminoethyl methacrylate | 85 |
| 85/10/5 lauryl methacrylate/methacrylanilide/beta-dimethylaminoethyl methacrylate | 81 |
| 85/10/5 tridecyl methacrylate/methacrylanilide/beta-diethylaminoethyl methacrylate | 90 |
| 85/10/5 octadecyl methacrylate/methacrylanilide/beta-diethylaminoethyl methacrylate | 82 |
| 65/25/10 lauryl methacrylate/N-tert.-octylacrylamide/beta-diethylaminoethyl methacrylate | 90 |

Still further data demonstrating the surprising effectiveness of the copolymers of this invention in dispersing sludge is given below. These data, obtained with the carbon suspension test used in the lubricating oil field as a standard bench test in demonstrating detergent activity, clearly show the superiority of these three component copolymers even in the extremely low ranges of the polymerizable basic tertiary amino-containing component.

For this test 30 grams of a commercial semi-reinforcing furnace black is pebble-milled for 24 hours with 300 grams of mineral oil. A 10 gram portion of the resulting paste is placed in a 4 oz. petroleum sample bottle, 0.2 gram of the particular copolymer being tested (dissolved in kerosene) added, the bottle filled to the shoulder with kerosene, the resulting suspension shaken well, and the rate of settling observed. The particular copolymers involved are prepared in general as described in Example I. The figures given in Table VI below represent the percent of the total volume of the test suspension in which settling is not visible.

*Table VI*

| | 1 hour | 3 hours | 24 hours | 48 hours | 72 hours | 7 days |
|---|---|---|---|---|---|---|
| 97/2/1 lauryl methacrylate/methacrylanilide/beta-diethylaminoethyl methacrylate | 100 | 100 | 90 | 79 | 67 | 37 |
| 90/9.5/0.5—same as above | 100 | 100 | 90 | 80 | 67 | 33 |
| Lauryl methacrylate (control) | 100 | 98 | 14 | 13 | 12 | 10 |

It will be observed that copolymers containing as little as 0.50% of the polymerizable tertiary amino-containing component show appreciably improved stabilizing action on the dispersion in comparison with unmodified lauryl methacrylate and even after 7 days are still more than 300% better than the unmodified lauryl methacrylate polymer.

The following examples illustrate the broader scope of this invention, i. e., the three component copolymers containing more than 25% combined N-hydrocarbon-substituted acrylamide component or less than 0.5% combined basic tertiary amino-containing component.

EXAMPLE VII

In a manner similar to that described in Example I 50 parts of n-decyl acrylate, 49 parts of N-tert.-octylacrylamide, 1 part of beta-diethylaminoethyl methacrylate, and 1 part of alpha,-alpha'-azodiisobutyronitrile, are heated together in an oxygen-free nitrogen atmosphere for six hours at 60° C. during which time the monomer mixture polymerizes to a clear, tacky, homogeneous, rubber-like mass. The yield of the three component 50/49/1 n-decyl acrylate/N-tert.-octylacrylamide/beta - diethylaminoethyl methacrylate copolymer is essentially quantitative. This copolymer is useful as a laminating resin or for coating fabrics or papers either from solution or in the melt.

EXAMPLE VIII

A mixture of 175 parts of lauryl methacrylate, 157.5 parts of N-tert.-octylacrylamide, and 17.5 parts of beta-diethylaminoethyl methacrylate, are agitated slowly with 100 parts of mineral oil (an SAE 10, solvent-extracted mid-continent oil) under an atmosphere of nitrogen. The mixture is heated to 65°–70° C. and one part of alpha,-alpha'-azodiisobutyronitrile initiator is added. Heating is continued at 65°–70° C. until the charge thickens to the point where agitation is difficult at which point 250 additional parts of mineral oil are added slowly with stirring. The polymerization is continued at 65°–70° C. for a total of 12 hours. There is thus obtained an essentially quantitative yield of 50/45/5 lauryl methacrylate/N - tert. - octylacrylamide/beta-diethylaminoethyl methacrylate copolymer as a 50% solution in the mineral oil. This three-component copolymer is useful as an adhesive or a blending agent for use with other synthetic resins or plastics.

EXAMPLE IX

A mixture of 90 parts of technical lauryl methacrylate, 9.75 parts of methacrylanilide, 0.25 part of beta-diethylaminoethyl methacrylate, and 0.75 part of alpha,alpha'-azodiisobutyronitrile, is polymerized in the manner described in Example I. A 90/9.75/0.25 copolymer of lauryl methacrylate/methacrylanilide/beta - diethylaminoethyl methacrylate copolymer is obtained in essentially quantitative yield as a tough rubber-like mass. This copolymer is useful as a detergent in nonionic systems and is as much as 600% more effective in such systems than a lauryl methacrylate homopolymer.

It will be understood the foregoing examples are merely illustrative and that the invention broadly comprises a copolymer whose polymeric components essentially consist of, by weight of the copolymer, 50%–97.75% of a polymerized compound from the group consisting of the acrylic and alpha-substituted acrylic esters of saturated aliphatic alcohols of at least 8 carbon atoms; 2%–49.75% of a polymerized N-hydrocarbon-substituted acrylamide; and 0.25%–48% of a polymerized ethylenically unsaturated compound containing a basic tertiary amino group, all three components except for hydrogen on carbon amido nitrogen being free of reactive hydrogens.

With respect to the acrylate component of these copolymers, the octyl, decyl, dodecyl, tetradecyl, hexadecyl, and octadecyl acrylates and methacrylates are all highly suitable. The esters containing alkyl groups of 12 to 18 carbon atoms are preferred since they are more soluble in lubricating oils than those containing alkyl groups of 8 to 10 carbon atoms. It is not necessary that the alkyl radical be derived from a pure alcohol. Technical grades of alcohols having an avergae carbon content within the range specified above are entirely suitable. Alkyl radicals derived from the commercially available alcohols such as the technical lauryl alcohol obtained by reduction of the fatty acids in coconut oil, and the analogous products made by hydrogenation of carbon monoxide, are especially suitable. A typical example of one of these commercially available, reduced coconut oil alcohols will contain approximately 3% of $C_{10}$ alcohol, 61% $C_{12}$ alcohol, 23% $C_{14}$ alcohol, 11% $C_{16}$ alcohol and 2% of $C_{18}$ alcohol.

Specific examples of the N-hydrocarbon-substituted acrylamide component of the instant copolymers include N-alkyl-substituted acrylamides and methacrylamides such as N-hexyl-, N-decyl-, N-tetradecyl-, and N-octadecylacrylamides and methacrylamides; N-cycloalkyl-substituted acrylamides such as N-cyclohexylacrylamide or -methacrylamide; and N-aryl- substituted acrylamides such as N-phenyl-, N-p-tolyl-, N-o-tolyl-, N-naphthylacrylamides or -methacrylamides. The N - alkyl-substituted acrylamides, although giving products of satisfactory solubility, must be used in higher proportions than the N-aryl-substituted acrylamides to give equivalent improvements in lubricants. Copolymers containing the N-aryl acrylamides are especially effective in improving the viscosity index of the lubricating oils. The N-naphthyl-substituted acrylamides tend to give products of lower monomer and polymer solubility than do the preferred N-phenyl-substituted acrylamides. Accordingly, the N-phenyl-substituted acrylamides represent the preferred acrylamide component.

Examples of the polymerizable, basic tertiary amino-containing compounds, which, in combined form, constitute the third component of the novel copolymers of this invention, include this type compound wherein the tertiary amino nitrogen is a member of a heterocycle and the polymerizable, ethylenic unsaturation is extranuclearly bonded to said heterocycle. Specific examples of this type include the cyclic, polyheteroatom containing, tertiary aminoalkyl acrylates, e. g., 4(beta-methacrylyloxyethyl)-morpholine; the vinyl pyridines, e. g., 2-vinylpyridine, 4 - vinylpyridine, 2-methyl-5-vinylpyridine, and the like. The polymerizable, basic tertiary amino-containing compounds also include this type compound wherein the tertiary amino nitrogen is acyclic and not bonded directly to an aromatic nucleus, e. g., the polymerizable, basic tertiary amino nitrogen-containing hydrocarbons such as p-dimethylaminomethylstyrene and the basic tertiary aminoalkyl acrylates. Specific examples of this latter type compound, which are the preferred polymerizable, basic tertiary amino-containing compounds, include dialkylaminoalkyl acrylates and alpha-hydrocarbon-substituted acrylates, e. g., beta-dimethylaminoethyl methacrylate, beta-diethylaminoethyl methacrylate, beta - di(n - butylamino)ethyl methacrylate, beta-diethylaminoethyl acrylate; dicycloalkylaminoalkyl acrylates and alpha-hydrocarbon-substituted acrylates, e. g., beta-dicyclohexylaminoethyl methacrylate; dialkylaminocycloalkyl acrylates and alpha-hydrocarbon-substituted acrylates, e. g., 2-(diethylamino)cyclohexyl methacrylate. The tertiary amino nitrogen in this component of the copolymers must be basic. For instance, a tertiary amino nitrogen directly bonded to a benzene nucleus is not basic enough to give the properties desired and such components are specifically excluded.

Because of the great petroleum solubility and lack of complicating side reactions in their preparation, it is preferred that all three components of the copolymers of this invention, i. e., the long-chain alkyl acrylates, the N-hydrocarbon-substituted acrylamides, and the polymerizable, basic tertiary amino-containing compounds, be free of reactive, i. e., Zerewitinoff active, hydrogens, except for hydrogen on carbon amido nitrogen.

The copolymers of this invention are prepared by conventional bulk, solution, or dispersion methods of addition polymerization in the presence of an initiator for such polymerizations. The polymerization is conveniently carried out by contacting a mixture of the desired three types of monomers in the necessary proportions with from 0.1% to 10%, preferably 0.2% to 2%, of a free radical liberating type of initiator in the presence or absence of an inert solvent or diluent, and preferably in an inert atmosphere, e. g., under a blanket of nitrogen. The mixture is then agitated and maintained at a temperature at which the polymerization initiator generates free radicals rapidly for sufficient time to cause the copolymerization to occur.

The free radical liberating initiators may be of any of the usual types, such as, the peroxy compounds, e. g., benzoyl peroxide, ditertiary butyl peroxide and the like, or the azo type initiators such as alpha,alpha'-azodiisobutyronitrile, 1,1'-azodicyclohexanecarbonitrile, and the like. An inert diluent which may be used is water, in which case the polymerization is preferably an emulsion polymerization. Inert solvents that may be used include hydrocarbons such as white mineral oil, lubricating oil and the like. Polymerization temperatures will usually range from room temperature or lower to 150° C. or higher, depending upon the particular polymerization/initiator system, the time of polymerization and the degree of polymerization desired. The time of polymerization will vary from 1 to 24 hours or longer, depending on the particular initiator system and the temperature of polymerization, as well as the degree of polymerization desired in the copolymer. These polymerizations are normally carried out at temperatures in the range of 50° to 70° C. for 2 to 24 hours. It should be added that it is desirable to carry the copolymerization to essential completeness to avoid the possibility of any unpolymerized monomers being present in the final copolymer. In fact, the copolymers prepared by bulk polymerization may be held under high vacuum conditions for some time so as to remove any unpolymerized monomers.

The copolymers of this invention are useful in many fields, for instance, as adhesives, felting agents, dispersing agents for non-aqueous systems, particularly hydrocarbon systems, coating agents for papers and fabrics, laminating resins, as blending agents with other synthetic resins or plastics, and the like.

Another major field of utility for certain of these copolymers is as additives for lubricants. However, the copolymers of this invention containing more than 15% of an N-aryl hydrocarbon-substituted acrylamide or 25% of an N-alkyl hydrocarbon-substituted acrylamide or more than 20% of the basic tertiary amino-containing component are not suitable in this use since they exhibit insufficient solubility in the lubricating oils. Those copolymers containing less than 0.5% of the basic tertiary amino-containing component are also not suitable in this use since they possess insufficient sludge suspension properties. Thus, the copolymers of this invention useful in this important field of lubricant additives and therefore preferred are those copolymers containing, by weight of the copolymer, from 55% to 97.5% long-chain alkyl acrylate, from 2% to 15% or 25% N-hydrocarbon-substituted acrylamide, depending upon whether, respectively, an N-aryl-substituted or an N-alkyl-substituted acrylamide is used, and from 0.5% to 20% of the basic tertiary amino-containing component. These copolymers are soluble in the commercially available lubricating oils, including the synthetic ester lube types, and when incorporated therein, greatly improve the resistance of the oil to sludge formation and deposition and also markedly improve the viscosity index of the oil while, at the same time, only slightly increasing the low temperature viscosity of the oil composition in contrast to much larger increases encountered with previously known lubricant additives capable of instituting a similar viscosity index improvement but having no visible effect on the sludging characteristics of the oil. These copolymers are also useful as stabilizers for inhibiting sludge formation and precipitation in domestic type fuel oils, as well as power transmission oils.

Copolymers having at least 1% of the basic tertiary amino-containing component will, in general, contribute better overall sludging characteristics to the lubricants. As the amount of the basic tertiary amino-containing component increases the overall behavior of the three component copolymers as general lubricant additives also improves. Thus, copolymers containing from 2.5%–5% to 20% of the combined basic tertiary amino-containing component are outstanding as lubricant additives. Since this component is the most expensive of those involved in preparing these three component copolymers, those copolymers containing from 5% to 15% of the basic tertiary amino-containing component are the most preferred.

The N-alkyl hydrocarbon-substituted acrylamides in general must be present in higher proportions than the N-aryl hydrocarbon-substituted acrylamides to contribute equivalent viscosity index improving properties to the copolymers. Hence, the N-aryl hydrocarbon-substituted acrylamides are generally preferred and of these, because of greater general solubility in the lubricating oils, the N-phenyl-substituted acrylamides are particularly preferred. A satisfactory range of acrylamide content for the copolymers to exhibit satisfactory overall viscosity improvement properties is from 2.5% to 10% combined acrylamide, particularly for the most preferred N-aryl hydrocarbon-substituted acrylamides.

Thus, the most preferred copolymers of this invention for use in the commercially important field of additives for lubricating compositions on an overall basis of cost, convenience of preparation, availability of monomers and a satisfactory balance of viscosity improvement properties and effect on sludging—the latter two being taken in conjunction with those previously mentioned—will contain from 5% to 15% of the basic tertiary amino-containing component, preferably a basic tertiary aminoalkyl acrylate, from 2.5% to 10% of an N-aryl hydrocarbon-substituted acrylamide, preferably an N-phenylacrylamide, and from 75% to 92.5% of a long-chain alkyl acrylate, preferably containing an alkyl radical of 12 to 18 carbons.

In the proportions given herein more than one species of each of the three generic classes of components involved can be used at any time provided the specific proportion ranges are not exceeded. For instance, a copolymer containing 40% of a 12 carbon alkyl ester of acrylic acid, 45% of a 16 carbon alkyl ester of methacrylic acid, 5% beta-diethylaminoethyl acrylate, 5% beta-dimethylaminoethyl methacrylate, 2.5% N-phenylacrylamide and 2.5% N-(p-tolyl methacrylamide is within the scope of the preferred copolymers.

As many apparently widely different embodiments of this invention may be made without departing from the spirit and scope thereof, it is to be understood that the invention is not limited to the specific embodiments thereof except as defined in the appended claims.

The invention claimed is:

1. A lubricating oil-soluble copolymer, the polymeric components of which essentially consist of, by weight of the copolymer, 55%–97.5% of a polymerized compound from the group consisting of the acrylic and alpha-alkyl substituted acrylic esters of saturated aliphatic alcohols containing from 12 to 18 carbon atoms, inclusive; 2%–15% of an N-aryl-substituted amide of an acid from the group consisting of acrylic and alpha-alkyl substituted acrylic acids, said N-hydrocarbon substituent being free of non-benzenoid unsaturation; and 0.5%–20% of a polymerized ethylenically unsaturated compound containing a basic tertiary amino group and being free of reactive hydrogens.

2. A lubricating oil-soluble copolymer as set forth in claim 1 wherein said compound containing an amino group is a compound from the group consisting of the esters of acrylic and alpha-substituted acrylic acids with alkyl tertiary aminoalkanols.

3. A lubricating oil-soluble copolymer, the polymeric components of which essentially consist of, by weight of the copolymer, 75%–92.5% of a polymerized methacrylic acid ester of a saturated alcohol containing from 12 to 18 carbon atoms, inclusive; 2.5%–10% of methacrylanilide; and 5%–15% of a methacrylic acid ester of a di-lower-alkyl-substituted amino-lower alkanol.

4. A lubricating oil-soluble copolymer, the polymeric components of which essentially consist of, by weight of the copolymer, 55%–97.5% of a polymerized compound from the group consisting of the acrylic and alpha-alkyl substituted acrylic esters of saturated aliphatic alcohols containing from 12 to 18 carbon atoms, inclusive; 2%–25% of an N-alkyl-substituted amide of an acid from the group consisting of acrylic and alpha-alkyl substituted acrylic acids, said N-hydrocarbon substituent being free of non-benzenoid unsaturation; and 0.5%–20% of a polymerized ethylenically unsaturated compound containing a basic tertiary group and being free of reactive hydrogens.

5. A lubricating oil-soluble copolymer as set forth in claim 4 wherein said compound containing an amino group is a compound from the group consisting of the esters of acrylic and alpha-substituted acrylic acids with alkyl tertiary aminoalkanols.

6. A lubricating oil-soluble copolymer, the polymeric components of which essentially consist of, by weight of the copolymer, 55%–97.5% of a polymerized compound from the group consisting of the acrylic and alpha-alkyl substituted acrylic esters of saturated aliphatic alcohols of at least 8 carbon atoms; 2%–25% of an N-hydrocarbon-substituted amide of an acid from the group consisting of acrylic and alpha-alkyl substituted acrylic acids, said N-hydrocarbon substituent being free of non-benzenoid unsaturation; and 0.5%–20% of a polymerized ethylenically unsaturated compound containing a basic tertiary amino group and being free of reactive hydrogens.

WILLARD E. CATLIN.

References Cited in the file of this patent

UNITED STATES PATENTS

| Number | Name | Date |
| --- | --- | --- |
| 2,138,763 | Graves | Nov. 29, 1938 |
| 2,311,548 | Jacobson et al. | Feb. 16, 1943 |
| 2,448,542 | McQueen et al. | Sept. 7, 1948 |
| 2,584,968 | Catlin | Feb. 12, 1952 |